United States Patent
Darr et al.

(10) Patent No.: US 9,797,288 B2
(45) Date of Patent: Oct. 24, 2017

(54) METHOD OF OPERATING A VEHICLE UNDER FROZEN DIESEL EMISSION FLUID CONDITIONS

(75) Inventors: Rebecca J Darr, Milford, MI (US); Paul Jasinkiewicz, Northville, MI (US); Kyle E Crawford, Howell, MI (US); Jason Daniel Mullins, Howell, MI (US); Matthew King, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1883 days.

(21) Appl. No.: 12/832,431

(22) Filed: Jul. 8, 2010

(65) Prior Publication Data
US 2012/0006003 A1    Jan. 12, 2012

(51) Int. Cl.
*F01N 3/00* (2006.01)
*F01N 3/20* (2006.01)

(52) U.S. Cl.
CPC .......... *F01N 3/208* (2013.01); *F01N 2610/02* (2013.01); *F01N 2610/105* (2013.01); *F01N 2900/0422* (2013.01); *F01N 2900/08* (2013.01); *F01N 2900/1811* (2013.01); *F01N 2900/1814* (2013.01); *Y02T 10/24* (2013.01)

(58) Field of Classification Search
CPC ......... F01N 2610/02; F01N 2900/1811; F01N 2900/08
USPC .................................................. 60/272–324
See application file for complete search history.

(56) References Cited

U.S. PATENT DOCUMENTS

| | | | |
|---|---|---|---|
| 6,363,771 B1* | 4/2002 | Liang et al. | 73/23.31 |
| 7,574,900 B2* | 8/2009 | Sasanuma et al. | 73/61.46 |
| 7,954,312 B2* | 6/2011 | Gresens | 60/286 |
| 7,991,533 B2* | 8/2011 | Huang | 701/101 |
| 8,316,636 B2* | 11/2012 | Nakamura | 60/295 |
| 2004/0025498 A1* | 2/2004 | Lambert et al. | 60/286 |
| 2005/0252201 A1* | 11/2005 | Lecea et al. | 60/286 |
| 2007/0298289 A1* | 12/2007 | Clingerman et al. | 429/13 |
| 2008/0098726 A1* | 5/2008 | Donaldson et al. | 60/286 |
| 2008/0098986 A1* | 5/2008 | McKay et al. | 123/396 |
| 2008/0178575 A1* | 7/2008 | Shaikh et al. | 60/274 |
| 2008/0306631 A1* | 12/2008 | Huang | 700/271 |
| 2009/0288734 A1* | 11/2009 | Barcin et al. | 141/95 |
| 2011/0107812 A1* | 5/2011 | Kasahara | 73/1.02 |

FOREIGN PATENT DOCUMENTS

| | | |
|---|---|---|
| DE | 10112139 A1 | 9/2002 |
| WO | WO 2009157102 A1 * | 12/2009 |

* cited by examiner

*Primary Examiner* — Mark Laurenzi
*Assistant Examiner* — Anthony Ayala Delgado
(74) *Attorney, Agent, or Firm* — Quinn IP Law

(57) ABSTRACT

A method of controlling a vehicle includes determining if a diesel emission fluid is at least partially frozen, and determining if the vehicle is currently operating in a low diesel emission fluid inducement protocol. If the vehicle is not currently operating in the low diesel emission fluid inducement protocol, and the diesel emission fluid is at least partially frozen, then a temporary minimum diesel emission fluid mass may be defined to prevent entry of the vehicle into the low diesel emission fluid inducement protocol.

20 Claims, 1 Drawing Sheet

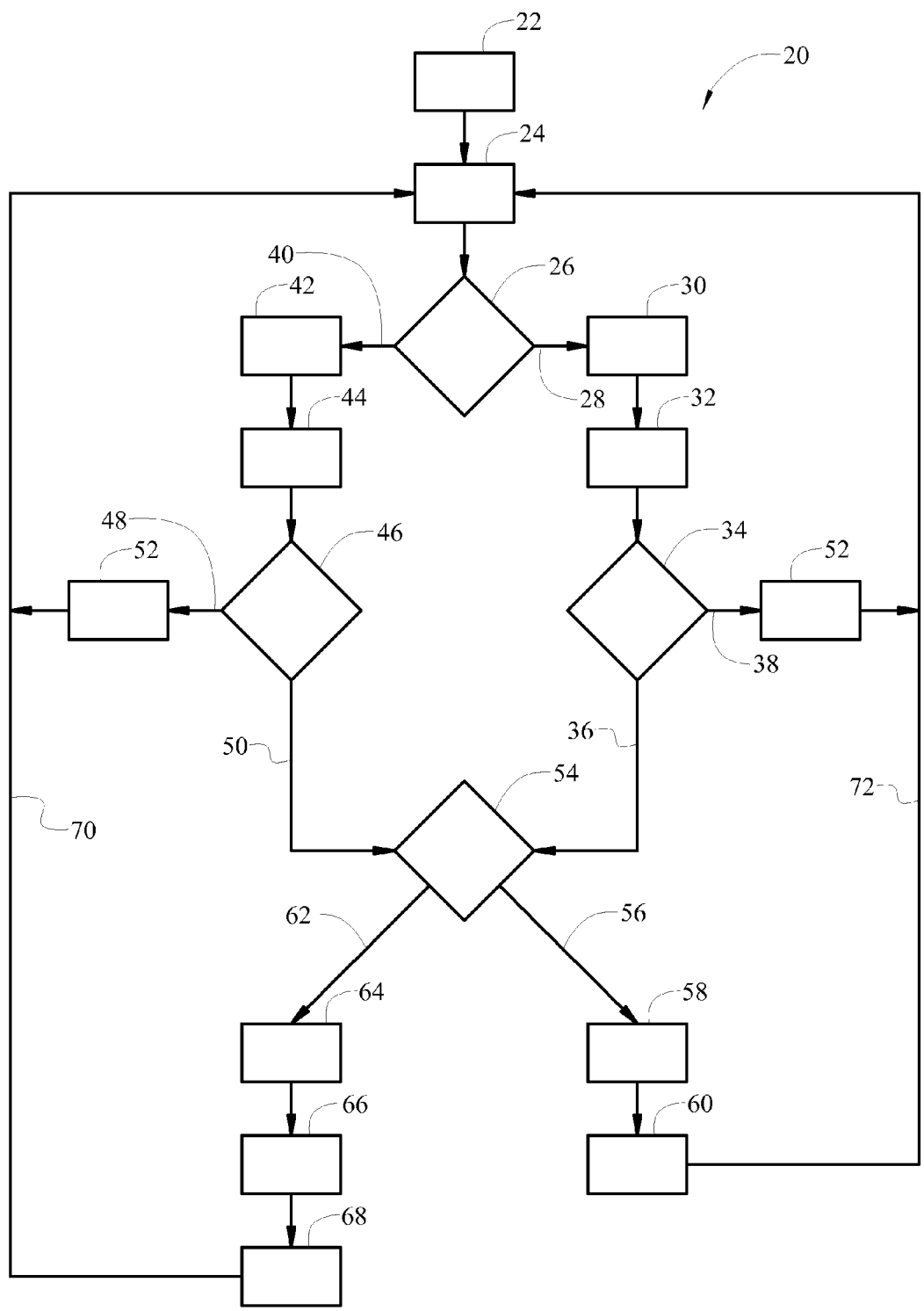

METHOD OF OPERATING A VEHICLE UNDER FROZEN DIESEL EMISSION FLUID CONDITIONS

TECHNICAL FIELD

The invention generally relates to a method of controlling a vehicle that uses a diesel emission fluid stored in a tank.

BACKGROUND

Diesel emission fluid is used in conjunction with a selective catalytic reduction catalyst to reduce oxides of nitrogen in the exhaust of the vehicle. The diesel emission fluid is stored in a tank disposed on the vehicle. The tank may include three discrete level sensors to determine the level of diesel emission fluid in the tank, i.e., the mass of the diesel emission fluid remaining in the tank. Additionally, the discrete level sensors may be utilized for refill detection when new diesel emission fluid is added to the tank. When the diesel emission fluid is thawed, i.e., in a liquid state, the vehicle operates in a non-frozen diesel emission fluid protocol. When in the non-frozen diesel emission fluid protocol, the mass of the diesel emission fluid is calculated by an algorithm, i.e., software, that evaluates the level of the diesel emission fluid in the tank based upon filtered signals from the three discrete level sensors. However, the diesel emission fluid must slosh around in the tank in order for the mass determination of the diesel emission fluid to function properly. Accordingly, if the diesel emission fluid is frozen and does not slosh around in the tank, the mass determination of the diesel emission fluid is not accurate, and does not accurately reflect the level and/or mass of the diesel emission fluid in the tank. Additionally, when the diesel emission fluid is in the frozen state, the discrete level sensors may not function and will not recognize that the diesel emission fluid is at or above the discrete level sensors.

The diesel emission fluid freezes at approximately negative eleven degrees Celsius (−11° C.). The tank includes a heater that keeps the diesel emission fluid thawed, or to thaw the diesel emission fluid when frozen. However, under certain ambient conditions, the diesel emission fluid may still freeze.

If the level and/or mass of the diesel emission fluid in the tank falls below a pre-determined level when considering the average consumption rate of the diesel emission fluid by the vehicle, the vehicle may be restricted to operation in a low diesel emission fluid inducement protocol. When operating the low diesel emission fluid inducement protocol, the speed of the vehicle is restricted to induce an operator of the vehicle to refill the tank. Once the software determines that the tank has been refilled with the diesel emission fluid, the vehicle discontinues the low diesel emission fluid inducement protocol, and is permitted to operate as normal. However, if the diesel emission fluid freezes before the refill of the tank is detected, the vehicle may continue to be restricted to the low diesel emission fluid inducement protocol.

SUMMARY

A method of controlling a vehicle that utilizes a diesel emission fluid stored in a tank is provided. The method includes determining if the diesel emission fluid is at least partially frozen, determining if the vehicle is currently operating in a low diesel emission fluid inducement protocol, and defining a temporary minimum diesel emission fluid mass which may be used to prevent initiation of the low diesel emission fluid inducement protocol. The temporary minimum diesel emission fluid mass is defined when the vehicle is not currently operating in the low diesel emission fluid inducement protocol, and when the diesel emission fluid is at least partially frozen.

Accordingly, defining the temporary minimum diesel emission fluid mass may be used to prevent the vehicle from entering into the low diesel emission fluid inducement protocol when the diesel emission fluid is frozen, and the vehicle would otherwise fail to properly sense the actual level of diesel emission fluid in the tank.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a flow chart showing a method of controlling a vehicle that utilizes a diesel emission fluid stored in a tank.

DETAILED DESCRIPTION

Referring to FIG. 1, a method of controlling a vehicle is generally shown at 20. The vehicle utilizes a Diesel Emission Fluid (DEF), which is stored in a tank that is disposed on the vehicle. The DEF is used in conjunction with a selective catalytic reduction catalyst to reduce oxides of nitrogen in the exhaust of the vehicle. The tank may include three discrete level sensors, which are used to determine the level of the DEF in the tank, i.e., the mass of the DEF remaining in the tank. Additionally, the discrete level sensors may be utilized for refill detection when new DEF is added to the tank.

The mass of the DEF is used to calculate the distance that the vehicle may be driven before running out of the DEF. This calculation is based on a rolling average of the consumption rate of the DEF and the mass of the DEF remaining in the tank.

When the DEF is thawed, i.e., in a liquid state, the vehicle operates in a non-frozen DEF protocol. When in the non-frozen DEF protocol, the mass of the DEF is calculated by an algorithm that evaluates the level of the DEF in the tank based upon filtered signals from the three discrete level sensors. However, the DEF must slosh around in the tank in order for the discrete level sensor filtering method to function properly. Additionally, when the DEF is in the frozen state, the discrete level sensors may not function and will not recognize that the DEF level is at or above the discrete level sensors. Accordingly, if the DEF is frozen and does not slosh around in the tank, the mass determination of the DEF is not accurate, and does not accurately reflect the level and/or mass of the DEF in the tank. For example, if the DEF is completely frozen, the mass determination of the DEF based upon the filtered signals from the three discrete level sensors may indicate that the tank is empty, i.e., no DEF, and cause the vehicle to operate in a low DEF inducement protocol, whereby the speed of the vehicle is restricted to induce an operator of the vehicle to add DEF. Therefore, when the DEF is frozen, or at least partially frozen, the vehicle operates in a frozen DEF protocol. When in the frozen DEF protocol, the vehicle bypasses the mass determination based upon the filtered signals from the three discrete level sensors, and instead initializes the DEF mass with the last known value of the DEF mass remaining in the tank. The strategy then calculates the DEF mass remaining by subtracting from the initialized value the mass of the DEF that has been dosed. Additionally, when in the frozen DEF protocol, the DEF tank mass calculated as previously described is not allowed to drop below a calibratable minimum mass threshold which may be used to prevent the vehicle form entering the low DEF inducement protocol, thereby allowing normal operation of the vehicle when the DEF is frozen.

The vehicle may include a controller, such as a computer and/or an engine control unit that is configured for controlling the operation of the vehicle. The controller may include, but is not limited to, all software, hardware, memory, sensors and algorithms required to sense, store, and manipulate all aspects of the vehicle associated with the provided method 20. As such, it should be appreciated that the method 20 may be embodied as a program operable on the controller.

The method 20 includes defining a frozen DEF temperature, block 22. The frozen DEF temperature may be defined as the temperature at which the DEF freezes. For example, the frozen DEF temperature may be defined to equal negative eleven degrees Celsius (−11° C.). Alternatively, the frozen DEF temperature may be set slightly higher than the temperature at which the DEF freezes to provide a margin of safety. It should be appreciated that the frozen DEF temperature is dependent upon the chemical composition of the DEF used, and may vary from the negative eleven degrees Celsius (−11° C.) described above.

The method 20 further includes determining if the DEF is at least partially frozen. Determining if the DEF is at least partially frozen may include sensing a temperature of the DEF in the tank, block 24. The temperature of the DEF may be sensed in any suitable manner, including but not limited to, sensing the temperature of the DEF in the tank with a sensor disposed in.

Determining if the DEF is at least partially frozen further includes determining if the engine of the vehicle is operating or is not operating, block 26. The engine control unit may be queried to determine it the engine is operating, i.e., running, or if the engine is not operating, i.e., turned off. If it is determined that the engine is not operating, indicated at 28, then determining if the DEF is at least partially frozen further includes defining a minimum engine off time, block 30, and measuring an engine off time period, block 32. The minimum engine off time ensures that enough time has elapsed since the engine has been turned off, i.e., is not operating, that any heat from the engine and/or from a tank heater configured for heating the DEF tank does not affect the temperature reading of the DEF. The minimum engine off time is the amount of time that is required for trapped heat to dissipate from around the tank, and may vary with the size of tank and the location of the tank within the vehicle. The minimum engine off time may be set to any time period, such as but not limited to, a twenty (20) minute time period. The engine off time may be measured in any suitable manner, including but not limited to measuring the engine off time with an internal clock of the vehicle or querying the engine control unit.

If the engine is not operating, then determining if the DEF is at least partially frozen further includes determining if the sensed temperature of the DEF in the tank is less than the frozen DEF temperature or greater than the frozen DEF temperature, and if the measured engine off time period is less than the minimum engine off time or greater than the minimum engine off time, block 34. When the engine is not operating, the DEF is determined to be at least partially frozen when the sensed temperature of the DEF in the tank is less than the frozen DEF temperature, and the measured engine off time period is greater than the minimum engine off time, indicated at 36. Alternatively, the DEF is determined to not be frozen when the sensed temperature of the DEF in the tank is greater than the frozen DEF temperature, and the measured engine off time period is greater than the minimum engine off time, indicated at 38.

When it is determined that the vehicle is operating, indicated at 40, then determining if the DEF is at least partially frozen further includes defining a minimum ambient air temperature limit, block 42, and sensing an ambient air temperature, block 44. Because the engine is operating and producing heat, and the tank heater may be operating to heat the DEF, the measured temperature of the DEF alone may not accurately reflect whether the DEF is at least partially frozen. The minimum ambient air temperature limit is a temperature that is sufficiently greater than the frozen DEF temperature, to ensure that the DEF is not frozen. The minimum ambient air temperature may be set to any temperature, depending upon the chemical composition of the DEF. For example, the minimum ambient air temperature may be defined as, but is not limited to, negative five degrees Celsius (−5° C.). The ambient air temperature may be sensed in any suitable manner, including but not limited to a temperature sensor disposed on the vehicle.

When the vehicle is operating, determining if the DEF is at least partially frozen further includes determining if the sensed temperature of the DEF in the tank is less than the frozen DEF temperature or greater than the frozen DEF temperature, and if the sensed ambient air temperature is less than the minimum ambient air temperature limit or greater than the ambient air temperature limit, block 46. When the engine is operating, it is determined that the DEF is not frozen when the sensed temperature of the DEF in the tank is greater than the frozen DEF temperature and has remained so for at least a minimum thaw time, and the sensed ambient air temperature is greater than the minimum ambient air temperature limit and has remained so for at least the minimum thaw time, indicated at 48. In order to ensure that the DEF is completely thawed, the conditions that the sensed temperature of the DEF in the tank is greater than the frozen DEF temperature and the sensed ambient air temperature is greater than the minimum ambient air temperature limit are required to be maintained for the minimum thaw time. The minimum thaw time may be defined as any suitable time period, including but not limited to, four hours. It is determined that the DEF is at least partially frozen when the sensed temperature of the DEF in the tank is less than the frozen DEF temperature, and the sensed ambient air temperature is less than the minimum ambient air temperature limit, indicated at 50. Alternatively, instead of monitoring the temperature of the DEF in the tank, actively heating the DEF in the tank with the tank heaters may be used to determine if the tank is at least partially frozen. In this situation, the DEF in the tank is considered to not be at least partially frozen if the vehicle is operating, the DEF tank heater is not heating, and the ambient air temperature is greater than a minimum threshold for a minimum thaw time.

When it is determined that the DEF is not frozen, indicated at 38 and 48, then the method 20 further includes operating the vehicle in the non-frozen DEF protocol, block 52. As described above, the non-frozen DEF protocol allows for the level of the DEF to be calculated based upon the filtered signals from the three discrete level sensors in the tank. Accordingly, if the vehicle was previously operating in the frozen DEF protocol and it is determined that the DEF is no longer frozen, i.e., not frozen, then the vehicle switches from the frozen DEF protocol back to the non-frozen DEF protocol.

The method 20 further includes determining if the vehicle is currently operating in a low DEF inducement protocol, block 54. If, when the vehicle is operating in the non-frozen DEF protocol and the distance remaining of the DEF is calculated to be less than a minimum level, then the vehicle may begin operation in the low DEF inducement protocol. If after the vehicle begins operating in the low DEF inducement protocol the DEF in the tank freezes, then the three discrete level sensors in the tank may not properly detect a refill of the DEF, thereby causing the vehicle to continue operation in the low DEF inducement protocol.

When it is determined that the DEF is at least partially frozen and the vehicle is not currently operating in the low DEF inducement protocol, indicated at 56, then the method 20 may further include defining the temporary minimum DEF mass to prevent initiation of the low DEF inducement protocol, block 58. When in the frozen DEF protocol, the vehicle bypasses the mass determination based upon the filtered signals from the three secrete level sensors, and instead initializes the DEF mass with the last known value of the DEF mass remaining in the tank. The strategy then calculates the DEF mass remaining by subtracting the DEF that has been dosed from the initialized value of the DEF mass. The DEF mass remaining in this mode is not allowed to drop below a defined temporary minimum DEF mass. The value of the temporary minimum DEF mass may be set to any suitable value in order to ensure that the vehicle does not enter into the low DEF inducement protocol.

When it is determined that the DEF is at least partially frozen and the vehicle is not currently operating in the low DEF inducement protocol, then the method 20 further includes disabling a DEF refill detection protocol, block 60. Because the refill detection protocol uses the filtered signals from the three discrete level sensors in the tank, the refill detection protocol does not function properly when the DEF is frozen and not sloshing around in the tank.

When it is determined that the vehicle is currently operating in the low DEF inducement protocol and the DEF is at least partially frozen, indicated at 62, then the method 20 further includes heating the DEF in the tank to thaw the DEF, block 64, and sensing a partially thawed level of the DEF in the tank with at least one of the three discrete level sensors, block 66. As described above, the tank includes the heater for heating the DEF. The heater may include any suitable type, style, size and/or configuration of heater suitable for the tank. The method 20 further includes defining a partially thawed DEF mass based upon the sensed partially thawed level of the DEF in the tank to permit exit of the vehicle from the low DEF inducement protocol, block 68. Because the DEF may not be completely thawed when detected by the discrete level sensors of the tank, the value for the partially thawed DEF mass is assigned based upon the highest level of the discrete level sensor that is detected once the DEF begins to thaw. For example, if the DEF is frozen, and only the second sensor of the three discrete level sensors detects the DEF, then the partially thawed DEF mass is assigned a mass value that is associated with the second sensor of the three discrete level sensors, whether that is the accurate mass or not. This allows the vehicle to exit from the low DEF inducement protocol when the DEF is at least partially frozen.

The method 20 may continue to operate in a loop, indicated at 70 and 72. Accordingly, the controller continuously monitors the temperature of the DEF in the tank, and the operation of the vehicle as described above, and changes the operation of the vehicle between the non-frozen DEF protocol and the frozen DEF protocol as required.

While the best modes for carrying out the invention have been described in detail, those familiar with the art to which this invention relates will recognize various alternative designs and embodiments for practicing the invention within the scope of the appended claims.

The invention claimed is:

1. A method of controlling a vehicle that utilizes a diesel emission fluid stored in a tank, the method comprising:
   determining if the diesel emission fluid is at least partially frozen;
   determining if a controller of the vehicle is currently operating the vehicle in a low diesel emission fluid inducement protocol; and
   defining a temporary minimum diesel emission fluid mass with the controller to prevent initiation of the low diesel emission fluid inducement protocol by the controller when the controller of the vehicle is not currently operating the vehicle in the low diesel emission fluid inducement protocol, and when the diesel emission fluid is at least partially frozen.

2. A method as set forth in claim 1 further comprising defining a frozen diesel emission fluid temperature.

3. A method as set forth in claim 2 wherein determining if the diesel emission fluid is at least partially frozen comprises sensing a temperature of the diesel emission fluid in the tank.

4. A method as set forth in claim 3 wherein determining if the diesel emission fluid is at least partially frozen further comprises determining if an engine of the vehicle is operating or is not operating.

5. A method as set forth in claim 4 wherein determining if the diesel emission fluid is at least partially frozen further comprises defining a minimum engine off time when the engine is not operating.

6. A method as set forth in claim 5 wherein determining if the diesel emission fluid is at least partially frozen further comprises measuring an engine off time period.

7. A method as set forth in claim 6 wherein determining if the diesel emission fluid is at least partially frozen further comprises determining if the sensed temperature of the diesel emission fluid in the tank is less than the frozen diesel emission fluid temperature or greater than the frozen diesel emission fluid temperature, and if the measured engine off time period is less than the minimum engine off time or greater than the minimum engine off time.

8. A method as set forth in claim 7 wherein determining if the diesel emission fluid is at least partially frozen is further defined as determining that the diesel emission fluid is at least partially frozen when the sensed temperature of the diesel emission fluid in the tank is less than the frozen diesel emission fluid temperature.

9. A method as set forth in claim 7 wherein determining if the diesel emission fluid is at least partially frozen is further defined as determining that the diesel emission fluid is not at least partially frozen when the sensed temperature of the diesel emission fluid in the tank is greater than the frozen diesel emission fluid temperature, and the measured engine off time period is greater than the minimum engine off time.

10. A method as set forth in claim 9 further comprising operating the vehicle in a non-frozen diesel emission fluid protocol when the diesel emission fluid is determined to be not at least partially frozen.

11. A method as set forth in claim 4 wherein determining if the diesel emission fluid is at least partially frozen further comprises defining a minimum ambient air temperature limit when the vehicle is operating.

12. A method as set forth in claim 11 wherein determining if the diesel emission fluid is at least partially frozen further comprises sensing an ambient air temperature.

13. A method as set forth in claim 12 wherein determining if the diesel emission fluid is at least partially frozen further comprises determining if the sensed temperature of the diesel emission fluid in the tank is less than the frozen diesel emission fluid temperature or greater than the frozen diesel emission fluid temperature, and if the sensed ambient air temperature is less than the minimum ambient air temperature limit or greater than the ambient air temperature limit.

14. A method as set forth in claim 13 wherein determining if the diesel emission fluid is at least partially frozen is further defined as determining that the diesel emission fluid is at least partially frozen when the sensed temperature of the diesel emission fluid in the tank is less than the frozen diesel emission fluid temperature, and the sensed ambient air temperature is less than the minimum ambient air temperature limit.

15. A method as set forth in claim 13 wherein determining if the diesel emission fluid is at least partially frozen is further defined as determining that the diesel emission fluid is not at least partially frozen when the sensed temperature of the diesel emission fluid in the tank is greater than the frozen diesel emission fluid temperature and maintained for a minimum vehicle operating time, or the sensed ambient air temperature is greater than the minimum ambient air temperature limit and maintained for a minimum vehicle operating time.

16. A method as set forth in claim 15 further comprising operating the vehicle in a non-frozen diesel emission fluid protocol when the diesel emission fluid is determined to be not at least partially frozen.

17. A method as set forth in claim 1 further comprising disabling a diesel emission fluid refill detection protocol when the diesel emission fluid is at least partially frozen, and the vehicle is not currently operating in the low diesel emission fluid inducement protocol.

18. A method as set forth in claim 1 further comprising heating the diesel emission fluid in the tank when the diesel emission fluid is at least partially frozen to thaw the diesel emission fluid.

19. A method as set forth in claim 18 further comprising sensing a partially thawed level of the diesel emission fluid in the tank with a plurality of discrete level sensors when the vehicle is currently operating in the low diesel emission fluid inducement protocol.

20. A method as set forth in claim 19 further comprising defining a partially thawed diesel emission fluid mass based upon the sensed partially thawed level of the diesel emission fluid in the tank when the vehicle is operating in the low diesel emission fluid protocol to permit exit of the vehicle from the low diesel emission fluid inducement protocol.

\* \* \* \* \*